Feb. 5, 1952 A. H. BELT 2,584,536
MEANS FOR MAKING HAMBURGERS
Filed Oct. 15, 1948
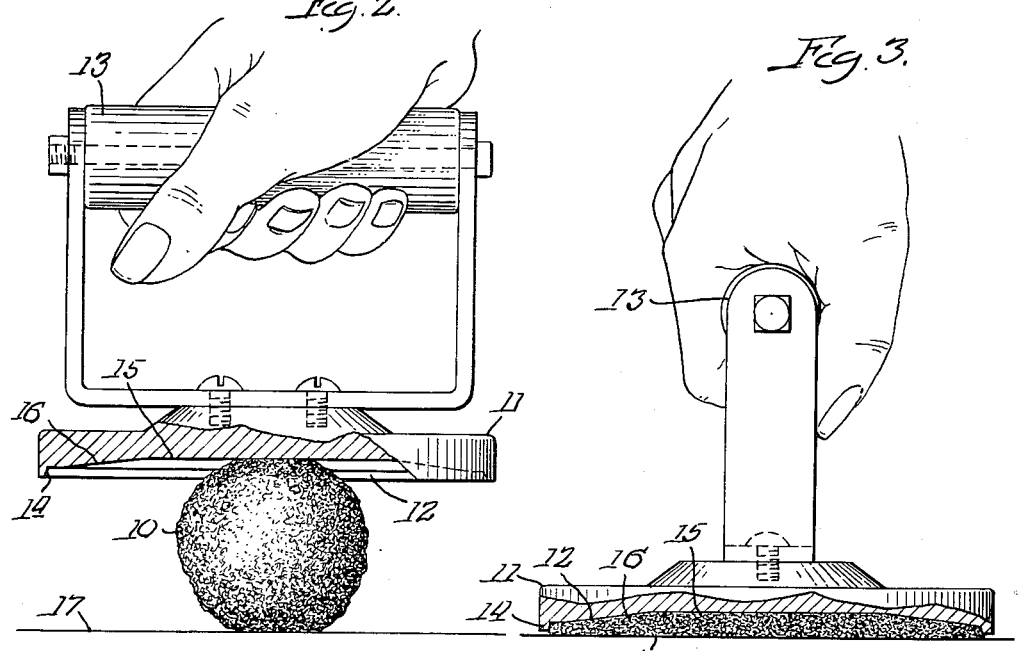
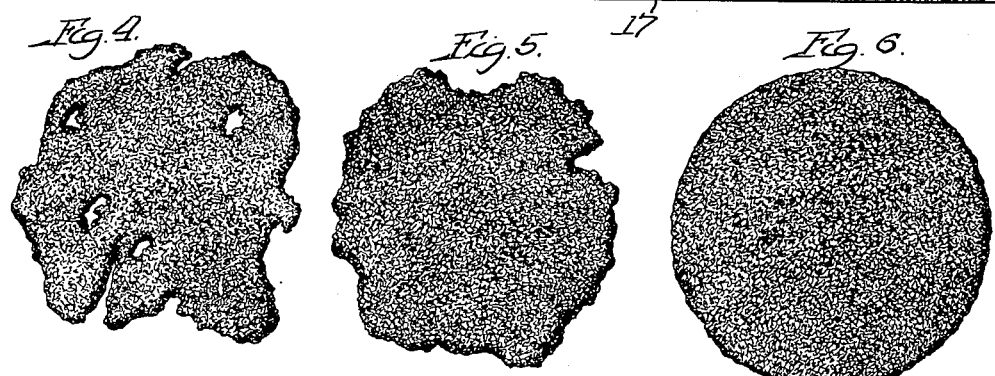
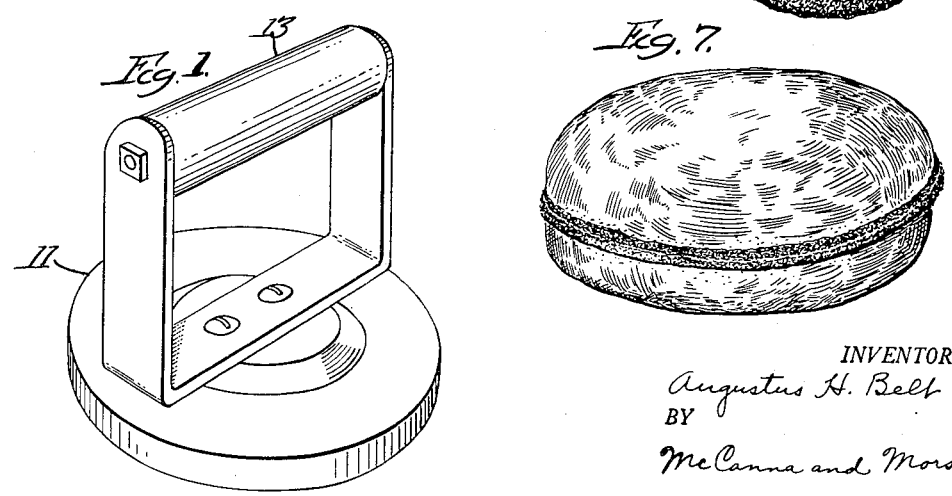
INVENTOR.
Augustus H. Belt
BY
McCanna and Morsbach Patented Feb. 5, 1952

2,584,536

UNITED STATES PATENT OFFICE 2,584,536

MEANS FOR MAKING HAMBURGERS

Augustus H. Belt, Bloomington, Ill.

Application October 15, 1948, Serial No. 54,806

1 Claim. (Cl. 99—349)

This invention relates to the art of cooking ground meat in the form of patties for making what is commonly known as hamburgers.

Heretofore a common method of making hamburgers was to pre-form the ground meat to a flat shape by hand molding or by the use of a suitable flat implement, place the meat patty on a heating surface for cooking, and turn the meat patty with a spatula or the like. This method requires a maximum of hand labor and time. Also, the meat is subject to considerable shrinkage, loss of meat juices, and loss of meat flavor. This is objectionable from a commercial viewpoint, particularly when the meat patty is to be sold as a hamburger for immediate consumption. Under such method the meat patty is invariably irregular in shape and is undesirable because the most acceptable hamburgers are made by placing the cooked meat patty between the halves of a baked bread bun and the irregular shape of the meat patty is unsatisfactory. This is particularly so where hamburgers are sold in quick-service eating places and in commercial establishments which specialize in preparing hamburgers. The irregular shape gives to the hamburger a deceptive appearance or one of insufficient meat content; and this combined with other undesirables abovementioned, tend to make unsatisfied customers.

Another common method is to start with a ball of ground meat, that is, a quantity of the desired approximate size, placing it on a heated surface for cooking, flattening and forming the meat by hand operation of a spatula, and turning it over with the spatula. This method involves the same objections as abovementioned except that the irregularity in shape and the time elements are more variable depending on the skill of the operator. A trained and skilled operator exercising special care can produce fairly acceptable and uniform results, but this involves the skill of a higher paid and experienced person; consequently it is difficult to maintain uniform results in commercial establishments, particularly in quick-lunch places, due to the high labor turnover and the difficulties in training, or attempting to train, unskilled workers. This is a major problem in this trade because the appearance of a hamburger as well as the quality of its contents is of real importance and a well earned reputation for excellence of product can be quickly impaired by carelessness or inexperience in preparing the hamburgers.

The present invention contemplates an improved method of making hamburgers under conditions particularly applicable to commercial establishments where the customer expects quick service and a first quality hamburger and where the hamburgers are prepared immediately on order. My invention aims to provide a method whereby a minimum of training or experience is required to quickly produce hamburgers having the desired uniformity in appearance, shape, and quality. Furthermore, in the practice of my invention, a higher degree of quality is obtained in that the meat juices and flavor are better retained. Another advantage is a material saving in time and consequently in cost of preparing hamburgers. Also, the more uniform and satisfactory hamburgers are a definite trade asset to a business of this kind.

Other objects and attendant advantages will be appreciated by those skilled in this art as the invention becomes better understood by reference to the following description when considered in connection with the accompanying drawing, in which, Figure 1 is a perspective view of a hand mold which I have designed for use in the practice of my invention;

Figure 2 is a view showing the manual application of the mold in a first step of making a meat ball into a patty while it is positioned on the heated surface for cooking, according to my invention, showing part of the mold in section;

Figure 3 is a view showing the next step of molding the meat patty against the heated surface;

Figures 4 and 5 are views of cooked meat patties typical of what is made by prior methods under commercial conditions such as above described;

Figure 6 is a view of a cooked meat patty made in accordance with my invention; and Figure 7 is a perspective view of the last mentioned meat patty between the halves of a bread bun making up what is known as a hamburger on bun, or as most commonly termed a "hamburger."

In the illustrative case herein described, I have provided a mold designated generally by 11 made of metal and having a cavity 12 of predetermined size and shape. Preferably a handle 13 is attached to the top of the mold with the hand-grasp portion spaced directly above and parallel with the face of the mold. The mold has a bottom edge portion 14 preferably arranged in a circle to provide the outer wall of the cavity and define the marginal shape of the patty form. The cavity is relatively shallow and preferably of greater depth at the central portion as at 15 with a wall 16 gradually inclining from the central portion to the peripheral wall of the edge portion 14. The cavity is thus shaped for the purpose of aiding in spreading the ground meat from the ball form 10 shown in Figure 2 to the flat form shown in Figure 3 when downward pressure is applied by hand. The cavity is further shaped to provide capacity for a meat ball or piece of given or approximate content such, for example as from 2 to 3 ounces. It is not essential that the ground meat be pre-shaped or compacted as shown in a ball 10, but it should be measured or sized to the desired approximate content. The mold is shaped to spread the meat to a given shape and thickness with a full body throughout. This uniform result is attained preferably by giving greater thickness to the central portion and gradually tapering the marginal portion, substantially as shown in the drawing. This forming operation of the mold also performs the function of spreading the meat on the heated cooking surface. In actual practice this surface is preferably maintained at about 350° F. and it is not greased. As a consequence of the described downward pressure of the mold and the consequent pressure of the meat patty against the heated surface, the under face of the meat patty will be quickly seared, thus sealing the meat against loss of meat juices and retaining the meat flavor. When the meat patty has been thus formed the handle is turned rotatively about the center axis of the mold to loosen the mold from the meat body. Along with this turning movement the mold is lifted from the meat form. The operation of the mold by downward pressure, turning, and lifting, may be quickly performed in a substantially continuous movement. More particularly, the downward pressure of the mold quickly spreads the ground meat in a full body throughout the full area of the mold against the heated grill surface. The meat patty thus formed and pressed against the heated grill surface quickly sticks to such surface in a sealing action. This sticking and sealing effect is the result of the combined pressure and heat. In consequence of this intimate contact with the grill surface substantially throughout the full area of the mold the meat patty is prevented from shrinking and distorting and the sealing of the meat at this surface serves to retain the juices of the meat body. In view of the uniform distribution of the meat and the sealing action it will be cooked to the desired degree throughout more quickly than with prior methods using a pre-formed meat body or an irregular meat body. Also, the meat body of greater thickness in the central area due to the greater depth of the mold aids in maintaining the desired form against shrinkage during the cooking. A spatula or any suitable flat implement may be slid under the meat patty for lifting, inverting, and placing it top side down on the heated surface for quick cooking of this side.

When the finished meat patty is placed in a bun as shown in Figure 7 the meat will appear of substantially uniform thickness entirely around the bun, giving visual appearance of its quantity and thereby contributing to better quality in a commodity of this kind. Also the full and uniform distribution of the meat combined with the juice saving, makes for a more desirable and appetizing product. This result is further enhanced by the greater thickness of the meat body in the central area because when biting into the hamburger one gets the impression of a thick meat body. My invention, however, may be practiced beneficially by a substantially uniform depth in the mold cavity, but preferably with a somewhat greater depth than the edge portion shown in the drawing. However, with the embodiment shown in the drawing a given or minimum meat content will produce the most satisfactory results.

In the practice of my invention, a hamburger having the described desirable characteristics may be made in approximately 50 seconds as compared with prior methods under which hamburgers of quite variable characteristics are made in from 2 to 3 minutes according to the method being used. This time factor is highly desirable, particularly because the saving of time is coupled with the production by unskilled help of hamburgers and the like having the described desirable qualities. Thus, with the practice of my invention and using a minimum quantity of meat, the most is obtained in the way of advantages and quality of the resultant product.

I claim:

Means for preparing and cooking ground meat patties for use in hamburgers comprising a mold having on its under side a shallow cavity of predetermined shape including at its marginal edge portion an upright form-defining wall, said cavity being of maximum depth at its center portion with gradually diminishing depth toward said form-defining wall, said cavity having a contents capacity of predetermined relation to a ground meat ball of given content and a handle on the side of the mold opposite from said cavity connected only to said mold and manually operable for pressing down on such meat ball which has been placed on a heated cooking surface, and by such pressure causing the bottom surface of the cavity to spread the meat ball to the full capacity of the cavity thereby forming a meat patty the marginal edge of which is confined and shaped by said upright edge wall of the mold and said downward pressure serving to uniformly press the meat patty against the heated surface and to promote searing of the under side of the meat patty and retaining the form thereof defined by said cavity, said handle being operable in a turning movement to move the mold with relation to the meat patty about its center axis and further operable to lift the mold from the meat patty.

AUGUSTUS H. BELT.

REFERENCES CITED

The following references are of record in the file of this patent:

UNITED STATES PATENTS

| Number | Name | Date |
|---|---|---|
| 508,759 | Reubold | Nov. 14, 1893 |
| 1,074,647 | Schmid | Oct. 7, 1913 |
| 1,624,214 | Cannon | Apr. 12, 1927 |
| 1,989,287 | Parr | Jan. 29, 1935 |
| 2,161,089 | Reinwald | June 6, 1939 |
| 2,230,062 | Jordan | Jan. 28, 1941 |
| 2,241,317 | Pringle | May 6, 1941 |
| 2,423,963 | Coffman | July 15, 1947 |
| 2,423,964 | Coffman | July 15, 1947 |